United States Patent [19]

Gokhale

[11] Patent Number: 4,835,467
[45] Date of Patent: May 30, 1989

[54] WHEEL SPEED SENSOR

[75] Inventor: Kalyan P. Gokhale, Warren, Mich.

[73] Assignee: General Motors Corporation, Detroit, Mich.

[21] Appl. No.: 147,978

[22] Filed: Jan. 25, 1988

[51] Int. Cl.$^4$ .............................. G01P 3/48
[52] U.S. Cl. .............. 324/166; 324/60 CD; 324/174
[58] Field of Search ............. 324/166, 167, 174, 207, 324/208, 60 CD

[56] References Cited

U.S. PATENT DOCUMENTS

| 3,569,737 | 3/1971 | Bauer et al. | 324/166 X |
| 3,617,715 | 11/1971 | Dummermuth | 324/166 X |
| 3,758,858 | 9/1973 | McCue | 324/166 |
| 3,868,570 | 2/1975 | Kopera | 324/166 |
| 4,086,532 | 4/1978 | Aronson et al. | 324/166 |
| 4,281,388 | 7/1981 | Friend et al. | 324/166 X |
| 4,626,781 | 12/1986 | Forkel | 324/174 |

Primary Examiner—Reinhard J. Eisenzopf
Assistant Examiner—Robert W. Mueller
Attorney, Agent, or Firm—Howard N. Conkey

[57] ABSTRACT

A magnetoresistive sensor monitors the passing of teeth on a rotating wheel and generates a DC biased speed signal. An amplifier compares this voltage with the capacitor voltage and charges or discharges the capacitor through a pair of parallel coupled, oppositely poled diodes to maintain the capacitor voltage equal to the DC biased speed signal. The voltage across the diode pair is supplied to a comparator switch to provide a pulse train having a frequency that is a measure of the rotational speed of the wheel.

3 Claims, 3 Drawing Sheets

WHEEL SPEED SENSOR

This invention relates to a wheel speed sensor and more particularly to such a sensor that is insensitive to variations in the sensor components and to wheel asymmetry.

Wheel speed sensors employing a toothed wheel and a magnetoresistive device for monitoring the passing of the teeth of the wheel as the wheel rotates are well known. In this form of sensor, the resistance of the magnetoresistor varies in a sinusoidal manner as the toothed wheel rotates. This property is utilized to develop a voltage signal in the form of a DC biased sinusoidal waveform. A signal conditioning circuit responds to the DC biased sinusoidal waveform and generates a squarewave pulse output for each sensed tooth of the rotating wheel thereby establishing a pulse train having a frequency equal to the number of teeth of the rotating wheel multiplied by the speed of rotation of the wheel. This pulse train provides a speed signal suitable for microprocessor interfacing.

In the foregoing form of speed sensor, typical signal conditioning circuits may provide an accurate speed related pulse train given ideal conditions. However, these typical signal conditioning circuits are sensitive to the wheel and magnetoresistive sensor characteristics and particularly to asymmetry in the rotating toothed wheel. For example, in actual practice, the toothed wheel may not perfect. The gap between the magnetoresistive sensor and the toothed wheel may not be constant and vary during rotation of the toothed wheel. This may be the result, for example, of eccentricity or wobble in the wheel due to production tolerances or due to wear over time in the wheel bearings. The typical signal conditioning circuit may be incapable of providing accurate speed sensing as a result of the variation in the output of the magnetoresistive sensor in response to this wobble or eccentricity in the toothed wheel.

In accord with this invention, a wheel speed sensor is provided that includes a toothed wheel and a magnetoresistive sensor monitoring the passing of the teeth as the wheel rotates. A signal conditioning circuit is provided that is insensitive to variations in the relationship between the wheel and the magnetoresistive sensor for providing a pulse train output having a frequency that is a measure of the speed of rotation of the wheel. Particularly, the signal conditioning circuit responds to the resistance variation caused only by the toothed wheel rotation and is insensitive to signal magnitude and to resistance changes in the magnetoresistive sensor due to unit-to-unit variations, temperature and eccentricity of the rotating toothed wheel. Particularly, the signal conditioning circuit provides for sensing the slope of the time varying signal generated via the magnetoresistive sensor to provide the pulse train signal output.

The invention may be best understood by reference to the following description of a preferred embodiment and the drawings in which:

FIG. 3b illustrates the pulse train signal output of a typical prior art signal conditioning circuit in response to the magnetoresistive sensor signal illustrated in FIG. 3a;

Figure 1:
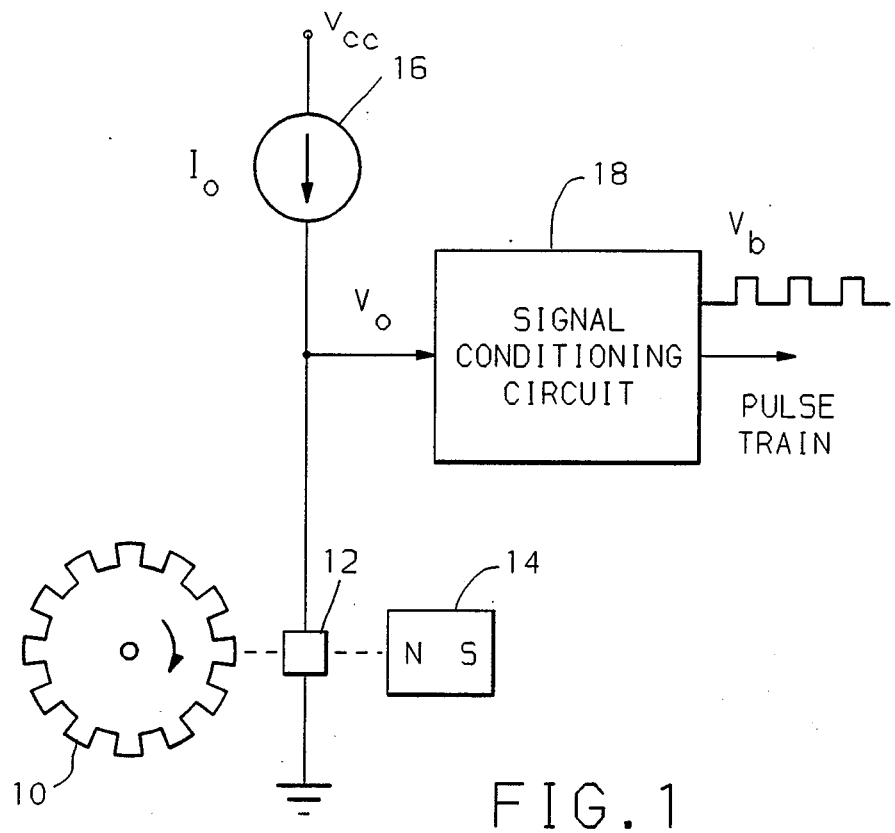
FIG. 1 is a schematic diagram of a wheel speed sensor employing a magnetoresistive sensor.

Referring to FIG. 1, a wheel 10 made of magnetic material and having teeth equally spaced around its periphery is driven by a rotating member whose rotational speed is to be detected. A magnetoresistive sensor comprised of a magnetoresistor 12 and a permanent magnet 14 is provided to sense the proximity of the teeth on the toothed wheel 10 and thereby sense the rotation of the wheel 10. The magnetoresistor 12 is positioned adjacent the toothed wheel 12 and the magnet 14 positioned relative to the magnetoresistor 12 to form a magnetic circuit that includes the wheel 10, the magnetoresistor 12 and the magnet 14.

In general, the magnetoresistor 12 exhibits a change in its resistance in the presence of a magnetic field with the magnitude of the resistance being dependent upon the flux density of the magnetic field. As the toothed wheel 10 is rotated, the air gap between the magnetoresistor 12 and the toothed wheel 10 is varied by the teeth and the spacing between the teeth. The reluctance of the magnetic circuit is a function of the air gap between the magnetoresistor and the wheel 10 so that as the toothed wheel 10 rotates, the flux density of the magnetic field in proximity to the magnetoresistor 12 is modulated between a maximum value when a tooth is directly opposed to the magnetoresistor 12 and a minimum value when the space between teeth is directly opposed to the magnetoresistor 12. Accordingly, since the resistance of the magnetoresistor 12 is a function of the flux density of the magnetic field, its resistance is modulated between minimum and maximum values at a frequency corresponding to the speed of rotation of the toothed wheel 10.

A voltage signal $V_o$ representing a measure of the resistance of the magnetoresistor 12 is developed by coupling the magnetoresistor 12 between ground reference potential and the output of a constant current source 16 providing a constant current $I_o$ therethrough. The constant current source 16 is coupled to a regulated voltage source providing a voltage $V_{cc}$ such as 5 volts. Since the current $I_o$ through the magnetoresistor 12 is constant, the voltage $V_o$ undergoes cyclic variations between minimum and maximum values corresponding to the minimum and maximum resistance values of the magnetoresistor 12 as the wheel 10 rotates.

The wheel speed sensor of FIG. 1 includes a signal conditioning circuit 18 that responds to the signal $V_o$ to provide a pulse train comprised of a series of pulses $V_b$ each corresponding to one cycle of the variation of the voltage $V_o$. This pulse train has a frequency directly related to the rotational speed of the toothed wheel 10 and accordingly is a measure of the speed of rotation of the rotating member.

Figure 2:
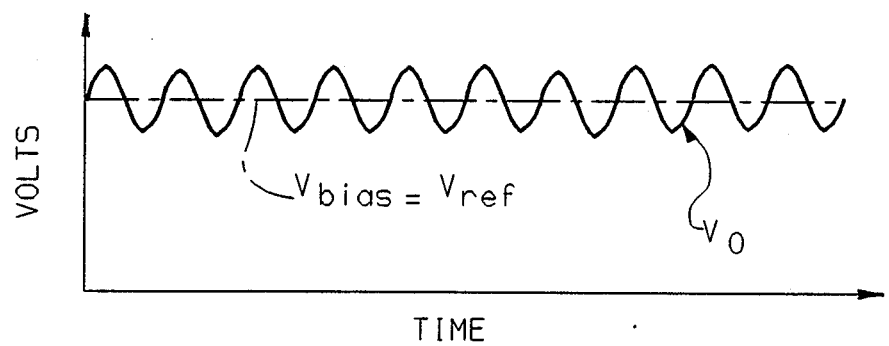
FIG. 2 illustrates an idealized magnetoresistive sensor signal output.

Referring to FIG. 2, a waveform is illustrated representing the voltage $V_o$ as the toothed wheel 10 rotates thereby modulating the resistance of the resistor 12 between minimum and maximum values. The voltage waveform $V_o$ is in the form of a biased sinusoidal waveform having an average value $V_{bias}$ that is equal to the average between the minimum and maximum values of the voltage signal $V_o$.

Figure 3A:
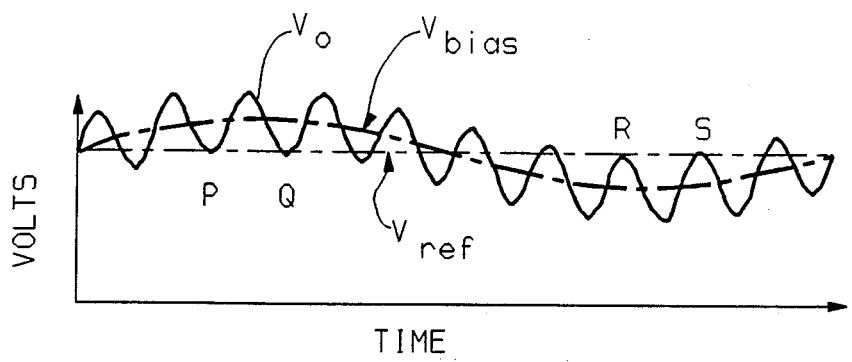
FIG. 3a depicts a magnetoresistive sensor signal output that results from eccentricity of the toothed wheel illustrated of FIG. 1.

The waveform of FIG. 2 depicts an idealized waveform. However, it is typical that the waveform of $V_o$ varies from that depicted in FIG. 2 due to conditions such as a wobble in the drive of the toothed wheel 10. This condition results in the air gap between the teeth and the magnetoresistor 12 cyclically varying as the toothed wheel 10 rotates. The resulting waveform is illustrated in FIG. 3a wherein the value of $V_{bias}$ (the average between the minimum and maximum values of $V_o$) goes through a cyclic variation over the period of rotation of the toothed wheel 10. As will be described, this may result in an erroneous indication of wheel speed in the prior art wheel speed sensors.

Figure 4:
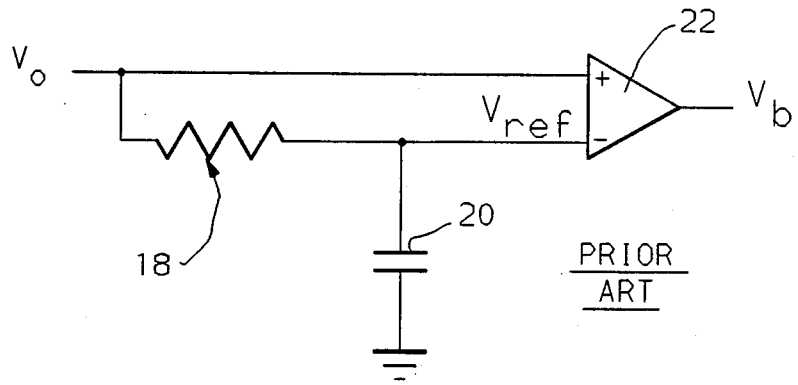
FIG. 4 depicts a prior art signal conditioning circuit producing the pulse train speed signal output illustrated in FIG. 3b.

FIG. 4 illustrates a typical prior art signal conditioning circuit. This circuit consists of a low pass RC filter comprised of a resistor 18 and a capacitor 20 and a comparator switch 22 whose output comprises the pulse signal $V_b$ of the pulse train output. The voltage signal $V_o$ across the magnetoresistor 12 is provided to the positive input of the comparator switch 22 and to the low pass filter. The low pass filter filters the variation in the voltage $V_o$ and produces an average value that is equal to a reference voltage $V_{ref}$ and which is applied to the negative input of the comparator switch 22. In the case of the waveform of FIG. 2, $V_{ref}$ is equal to the average voltage value $V_{bias}$. The resulting output of the comparator switch 22 is the series of voltage pulses $V_b$ each of which is at a high level when $V_o$ is greater than $V_{ref}$ and a low value when $V_o$ is less than $V_{ref}$.

Figure 3B:
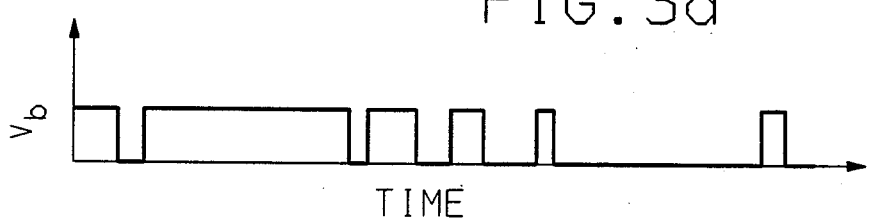

As long as Vo is substantially equal to the idealized voltage waveform illustrated in FIG. 2, the pulse train output of the comparator switch 22 accurately represents the speed of the rotating member. However, the following observation can be made relative to the circuit of FIG. 4. The low pass filter comprised of the resistor 18 and the capacitor 20 should be ideal meaning that its cutoff frequency should be as low as possible so that it will filter out all the variations in $V_o$ at very low rotational speeds of the toothed wheel 10 thereby producing the true average voltage $V_{ref}$ even under very low rotational speeds of the toothed wheel 10. However, as previously indicated, it is typical that in practice, the waveform of $V_o$ may vary from the ideal waveform as shown in FIG. 3a. As previously indicated, the value of $V_{bias}$ is no longer at a constant level but itself varies sinusoidally because of the periodically varying air gap between the toothed wheel 10 and the magnetoresistor 12. The period of this sinusoidal varying value of $V_{bias}$ is equal to the time required for one revolution of the toothed wheel 10. If this voltage is provided to the prior art signal conditioning circuit of FIG. 4, the low pass filter contained therein having a very low cutoff frequency to accommodate low rotational speeds of the toothed wheel 10 will filter all of the variations particularly at higher speeds and will produce an average voltage $V_{ref}$ as shown in FIG. 3a. In the comparison of $V_o$ and $V_{ref}$, comparator switch 22 will produce a pulse train output that fails at points P, Q, R and S. This will result in the voltage pulses Vb of the pulse train as depicted in FIG. 3b. As seen in this FIGURE, some of the pulses $V_b$ are missing from the pulse train so that the frequency of the pulses $V_b$ is less than the actual frequency of the cyclic variation in the voltage $V_o$. This represents an error in the measurement of the rotational speed of the wheel 10.

Figure 5:
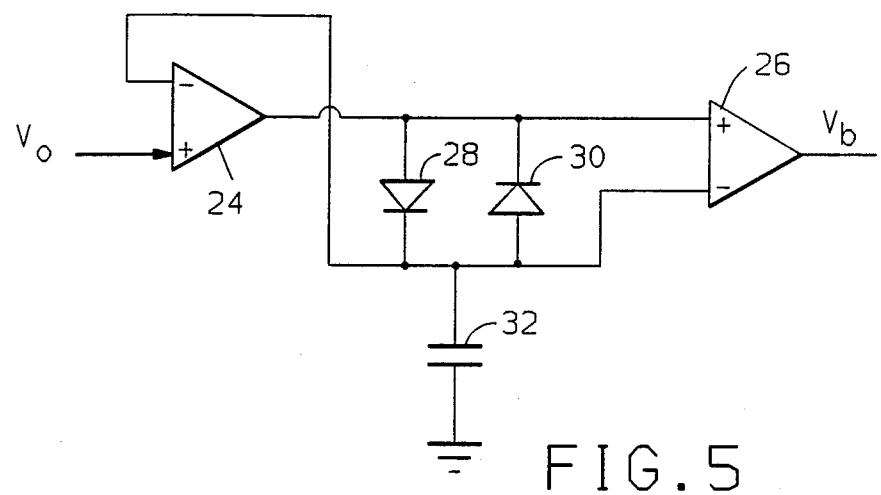
FIG. 5 illustrates a signal conditioning circuit incorporating the principles of this invention.

In accord with this invention, a signal conditioning circuit 18 is provided taking the form of the circuit illustrated in FIG. 5. As opposed to comparing the voltage $V_o$ with a reference voltage such as the voltage Vref generated in the prior art circuit of FIG. 4, the circuit of FIG. 5 provides an output based on the slope of the signal $V_o$ and is therefore independent of the absolute magnitude thereof. Therefore, the circuit is independent of the bias voltage $V_{bias}$ and therefore insensitive to its change as a result of the eccentricity of the toothed wheel 10.

The circuit of FIG. 5 includes an operational amplifier 24 having a high gain such as 100,000. A series circuit comprised of a pair of parallel coupled diodes 28 and 30 and a capacitor 32 is coupled between the output of the amplifier 24 and the ground reference potential. The parallel coupled diodes are oppositely poled, i.e., the anode of one being connected to the cathode of the other. The voltage across the capacitor is coupled to the negative input of the amplifier 24 to be compared with the voltage $V_o$ which is coupled to the positive input of the amplifier 24.

The voltage across the parallel coupled diode pair 28 and 30 is coupled to the positive and negative inputs of a comparator switch 26. The output of the comparator switch 26 comprises the voltage pulses $V_b$ in the pulse train output of the signal conditioning circuit 18 of FIG. 1.

Figure 6:
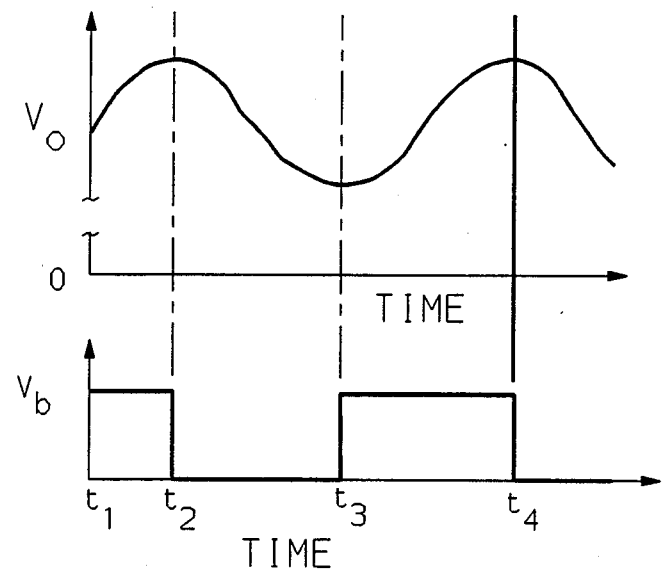
FIG. 6 illustrates the wheel speed pulse train signal output provided by the signal conditioning circuit of FIG. 5.

The operation of the circuit of FIG. 5 is described with reference to the voltage diagrams of FIG. 6 where the upper diagram represents the input signal $V_o$ developed across the magnetoresistor 12 and the lower diagram depicts the pulse signal $V_b$ in the pulse train output of signal conditioning circuit 18.

The operational amplifier 24 compares the voltage across the capacitor 32 with the voltage $V_o$ and charges or discharges the capacitor 32 through the diode pair 28 and 30 to maintain the capacitor voltage equal to the value of $V_o$. When the capacitor voltage is less than $V_o$, the amplifier 24 charges the capacitor 32 through the forward biased diode 28 and when the capacitor voltage is greater than $V_o$, the amplifier 24 discharges the capacitor 32 through the forward biased diode 30. Therefore, during the period $t_1$ to $t_2$ during which the voltage $V_o$ is increasing to its peak value, the amplifier 24 charges the capacitor 32 through the diode 28 to maintain the capacitor voltage equal to the input voltage $V_o$. During the period $t_2$ to $t_3$ during which the voltage $V_o$ is decreasing to its minimum value, the amplifier 24 discharges the capacitor 32 through the diode 30 to maintain the capacitor voltage equal to the input voltage $V_o$. During the subsequent period $t_3$ to $t_4$ the conditions are as described with respect to the time period $t_1$ to $t_2$.

While the capacitor 32 is being charged or discharged, the input voltage to the comparator switch 26 is equal to the value of the forward biased diode junction voltage drop (typically about 0.6 volts). However, the input voltage to the comparator switch 26 has one polarity when the diode 28 is conducting during the charging period of the capacitor and an opposite polarity when the diode 30 is conducting during the discharging period of the capacitor. Specifically, the voltage at the positive input of the switch 26 is greater than the voltage at its negative input when the diode 28 is conducting while the capacitor is being charged and the voltage at its negative input is greater than the voltage at its positive input when the diode 30 is conducting while the capacitor is being discharged. The resulting voltage pulses $V_b$ at the output of the comparator switch 26 relative to the voltage $V_o$ is illustrated in FIG. 6. These pulses comprise the pulse train output of the signal conditioning circuit 18 of FIG. 1.

Accordingly, as $V_o$ varies between its minimum and maximum values as the toothed wheel 10 rotates, the signal conditioning circuit illustrated in FIG. 5 provides the pulse train output comprised of the individual pulses $V_b$ for each period of the variation of the waveform $V_o$. The logic level output of the signal conditioning circuit of FIG. 5 is thus based on the slope of the output signal $V_o$ and not on the bias voltage $V_{bias}$. Accordingly, the circuit is insensitive to the variation in $V_{bias}$ so that even with the waveform depicted in FIG. 3a, a pulse train that accurately depicts the speed of the tooth wheel 10 is provided.

In addition to being insensitive to the variations in the value of $V_{bias}$, the signal conditioning circuit of FIG. 5 has been found to be effective even for very small amplitude variations in the signal $V_o$. For example, the signal conditioning circuit of FIG. 5 may be very effective even for large air gaps between the magnetoresistor 12 and the teeth on the toothed wheel 10. In one embodiment, the circuit was found to be effective when the variation of $V_o$ in response to rotation of the toothed wheel 10 was as low as 40 millivolts.

The foregoing description of a preferred embodiment of the invention for the purpose of illustrating the invention is not to be considered as limiting or restricting the invention since many modifications may be made by the exercise of skill in the art without departing from the scope of the invention.

I claim:

1. Apparatus for sensing the speed of rotation of a rotating member, the apparatus comprising, in combination:

means for generating a speed signal having a voltage value between maximum and minimum values at a frequency related to the rotational speed of the rotating member;

a capacitor;

first and second parallel coupled diodes, the diodes having opposed polarity;

charge control means for comparing the capacitor voltage and the speed signal and (A) charging the capacitor through the parallel coupled diodes when the speed signal is greater than the capacitor voltage and (B) discharging the capacitor through the parallel coupled diodes when the speed is less than the capacitor voltage, the parallel coupled diodes having a forward biased diode voltage drop thereacross while the capacitor is being charged and discharged, the diode voltage drop having a first polarity when the capacitor is being charged and a second polarity when the capacitor is being discharged; and a comparator responsive to the forward biased diode voltage drop for generating a pulse train signal having first and second states corresponding respectively to the first and second polarities of the forward biased voltage drop, the pulse train signal having a frequency that is a measure of the speed of rotation of the rotating member.

2. The apparatus of claim 1 wherein the capacitor is series coupled with the parallel coupled diodes and the charge control means includes (A) an amplifier having positive and negative inputs and an output, (B) means for coupling the speed signal to the amplifier positive input, (C) means for coupling the capacitor voltage to the amplifier negative input, and (D) means for coupling the amplifier output across the series coupled capacitor and parallel coupled diodes.

3. The apparatus of claim 2 wherein the means for generating a speed signal includes (A) a wheel rotated by the rotating member, the wheel having teeth spaced around its periphery, (B) a magnetoresistive sensor positioned adjacent the periphery of the wheel for sensing the proximity of the teeth as the wheel is rotated, the magnetoresistive sensor having a resistance varying between maximum and minimum values as the teeth are rotated thereby and (C) means for supplying a constant current to the magnetoresistive sensor, the voltage across the magnetoresistive sensor comprising the speed signal.

* * * * *